Feb. 27, 1962  E. H. SCHUTTENBERG  3,022,726
INSPECTION MARKING DEVICE
Filed Feb. 16, 1960  2 Sheets-Sheet 1

INVENTOR.
ELMER H. SCHUTTENBERG
BY
Bosworth, Sessions,
Herstrom & Knowles
ATTORNEYS

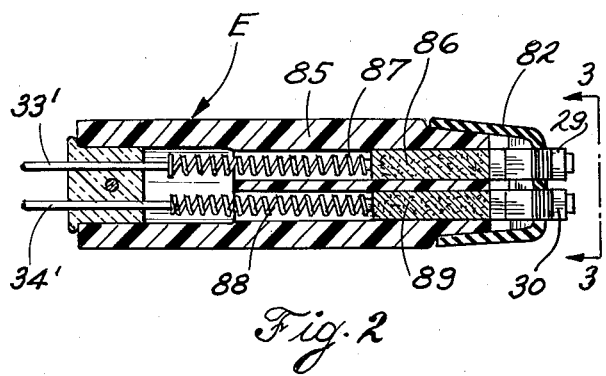
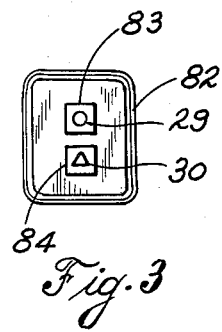
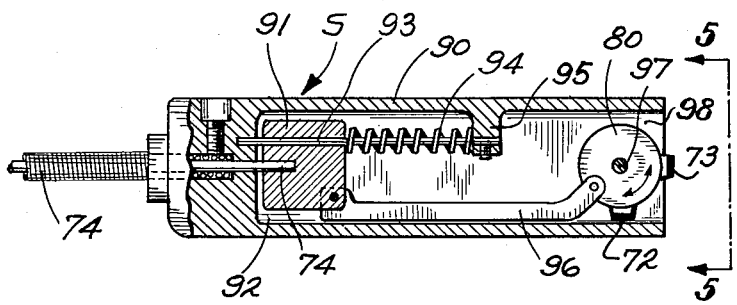
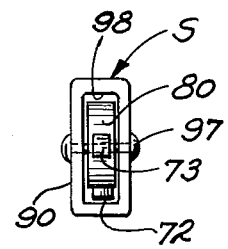

United States Patent Office 3,022,726
Patented Feb. 27, 1962

3,022,726
INSPECTION MARKING DEVICE
Elmer H. Schuttenberg, 2170 Arthur Ave.,
Lakewood, Ohio
Filed Feb. 16, 1960, Ser. No. 9,017
8 Claims. (Cl. 101—42)

This invention relates to apparatus for measuring certain dimensions or properties of articles to be inspected and marking them with a mark or symbol which indicates whether the part is "Satisfactory" or is a "Reject."

It is a usual inspection operation to have a gage or measuring instrument so designed that when a part to be measured is placed on the instrument, it will be measured and the instrument will indicate by suitable means, such, for example, as a green light for "Satisfactory" or a red light for "Reject," the condition of the part. The inspector then applies either a "Satisfactory" or a "Reject" stamp to the part, depending upon the indication of the measuring instrument. This procedure, however, is slow and is subject to error because the operator may select and apply the wrong stamp.

According it is an object of the present invention to provide in inspection marking apparatus whereby a dimension or property of a part may be measured by a suitable gage or measuring instrument and, according to whether the measuring instrument indicates that the part is "Satisfactory" or "Reject," the marking device will be so activated that when applied to the work by the operator, only a mark corresponding to the condition indicated by the gage will be made on the part.

A further object of my invention is the provision of an automatic selective inspection marking apparatus wherein the marking device will be conditioned to apply a mark corresponding to the reading of the gage for a predetermined time period after the part has been gaged and the operator has activated the marking unit even though the part be removed from the measuring instrument, such time period being sufficient to permit the operator to apply the mark to the part that has just been gaged but terminating promptly thereafter so that the operator is not able to apply the indicated mark to a number of parts that have not been gaged.

Other objects of my invention are: the provision of an automatic selective marking apparatus that may readily be applied to measuring instruments and gages currently in use, for example, devices of the type where a signal light is used to indicate whether the part is good or bad; the provision of an automatic selective marking apparatus for use with gages or other measuring instruments and which is particularly adapted for use with electro-chemical stencil type marking devices but which may also be readily used with printing type devices such as rubber stamps or the like; and the provision of an automatic selective marking apparatus for use with inspection instruments which is rugged, inexpensive to produce and operate, and completely reliable in use.

The above and other objects of my invention will appear from the following description of several embodiments thereof, reference being had to the accompanying drawings in which:

FIGURE 1 schematically illustrates my improved measuring and marking apparatus and includes the electrical circuits thereof;

FIGURE 2 is a longitudinal cross-sectional view of an electro-chemical dual marking device adapted to be used with the apparatus for FIGURE 1;

FIGURE 3 is an end view, taken substantially on line 3—3 of FIGURE 2, of the electro-chemical dual marking device;

FIGURE 4 is a longitudinal cross-sectional view of a rubber stamp type dual marking device that may also be used with the apparatus of FIGURE 1; and FIGURE 5 is an end view of the marking device of FIGURE 4, taken substantially on line 5—5 of FIGURE 4.

Figure 1:
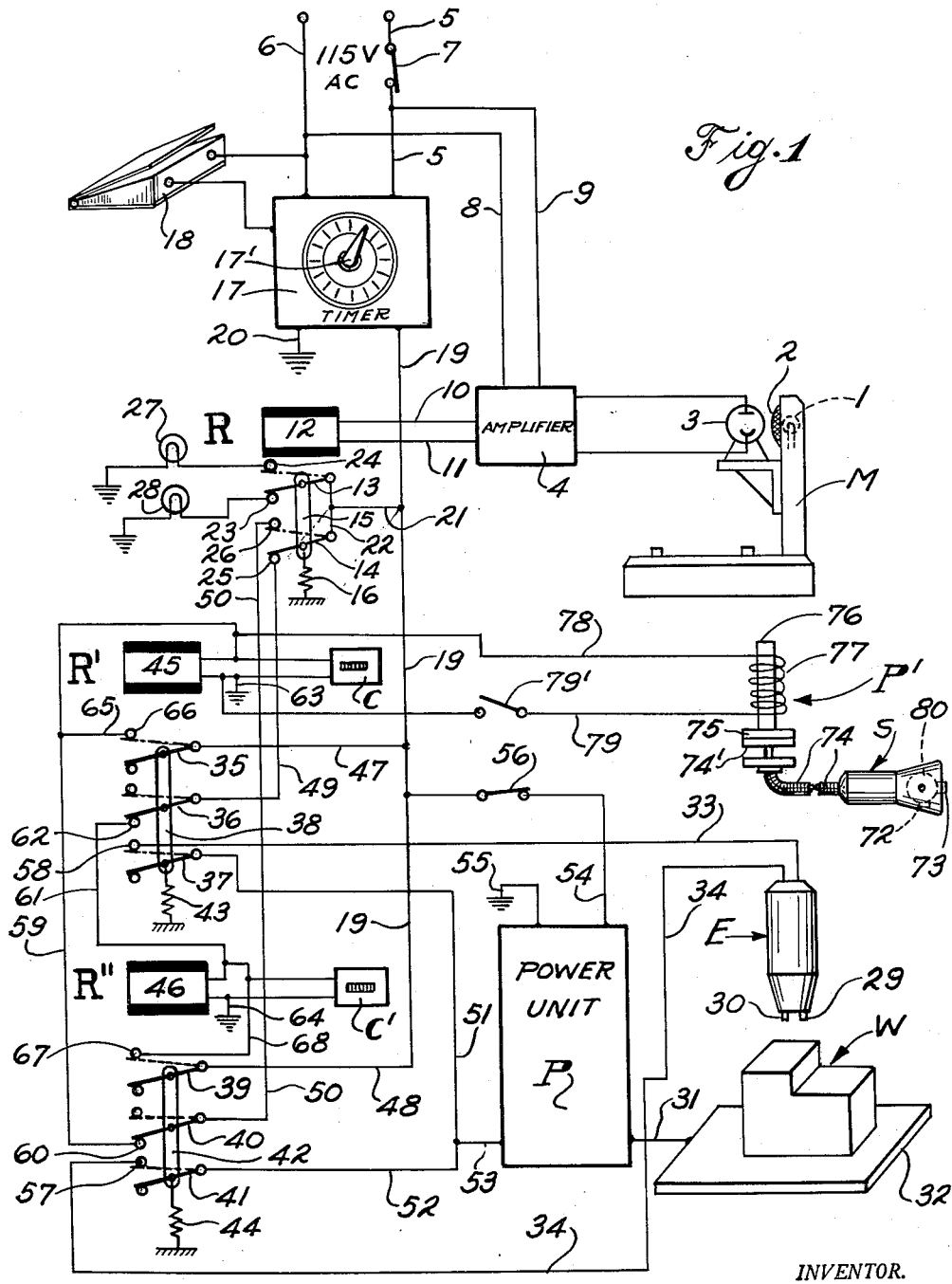

In order to facilitate an understanding of my inspection marking apparatus, I have illustrated a number of the elements thereof schematically and have, in FIGURE 1, shown them in association with electrical circuitry which renders the entire apparatus operable in the manner and for the purposes intended.

Referring now to FIGURE 1, a measuring instrument or gage is indicated at M. As shown, this instrument is designed to measure a physical dimension of a part to be gaged such as that indicated at W in FIGURE 1. The instrument is so arranged that when the part is positioned thereon in gaging position, an electric light 1 will be lighted if the dimension being measured is within the predetermined satisfactory limits. If the measurement is outside of the satisfactory limits or in the reject range, the lamp 1 will not be lighted. A green glass bull's-eye 2 may be postioned adjacent the lamp 1 as a visual indication of a "Satisfactory" reading and, if desired, the gage M may include a red bull's-eye (not shown) which will be illuminated in the event the part is unsatisfactory or "Reject." Although I have illustrated the apparatus as being responsive to the "Satisfactory" measurement of the instrument or gage, it will be understood that it may also readily be arranged to be responsive to the "Reject" signal of the gage. It will also be understood that the measuring instrument M is merely illustrative and that other types that indicate the condition of the part by electrical contacts, or other means, as distinguished from lights, may be used with my apparatus.

The general mode of operation of my apparatus is to activate a multiple marking unit, having a plurality of marking stamps or stencils to indicate different conditions of the part being measured in response to measurement made by a gage or other measuring instrument. In the apparatus illustrated in FIGURE 1, if the measuring instrument M determines that a part W is satisfactory, the green bull's-eye 2 lights up and only the "Satisfactory" marking unit of the dual marking device E will be activated. If, on the other hand, the part is not satisfactory and the green bull's-eye 2 remains dark, the apparatus of FIGURE 1 is so arranged that only the "Reject" marking unit of the dual device will be activated or operable and the only mark that the operator can apply to the part will be the "Reject" mark.

To effect the above described mode of operation, I provide a sensing means which is responsive to the measurement indicating means of the gage M. As illustrated, this sensing means includes a photoelectric cell 3 positioned adjacent the bull's-eye 2 and responsive to the light emanating therefrom. The photoelectric cell 3 is connected to an amplifier unit 4, which may be of any well-known and suitable type, adapted to permit current to flow through a controlled circuit when the photoelectric cell 3 is influenced by light from the bull's-eye 2 and to prevent the flow of current through the controlled circuit when the photoelectric cell is not so influenced.

A source of suitable electrical current, for example 115 volt A.C., is connected to the lines 5 and 6. An on-off switch 7, shown closed in FIGURE 1, is positioned in line 5 to permit the operator to render the entire apparatus inoperative when not in use. Lines 8 and 9 extend from the current supply lines 5—6 to the amplifier unit 4, switch 7 being positioned to control the connection of the amplifier to the current source, and the amplifier controls the flow of current to and through lines 10 and 11 which lead from the amplifier to the coil 12 on the sensing relay generally indicated at R. Amplifier 4 will be activated as soon as switch 7 is closed and thus will be "warmed up" and ready for instantaneous response as long as switch 7 remains closed. The sensing relay R is of the double arm type, the arms 13 and 14 being connected for simultaneous movement by the link 15. A spring 16 normally holds these arms in the positions shown in full lines in FIGURE 1.

From the above description, it will be apparent that, when the bull's-eye 2 of the measuring instrument M is dark, as is the case when the part measured is not satisfactory, the photoelectric cell 3 will not be activated and the amplifier unit will not permit current to flow to the coil 12 of relay R to energize same. Accordingly the spring 16 will hold the relay arms 13 and 14 in the positions seen in full lines in FIGURE 1. However, if the bull's-eye 2 of the measuring instrument M is illuminated indicating a "Satisfactory" measurement of a part being gaged, then the photoelectric cell 3 will activate the amplifier unit 4 to permit current to flow from the supply line 5—6 through the lines 8—9 and 10—11 to the coil 12 of relay R. Energization of this coil will cause the arm 13—14 to move simultaneously up into the positions seen in dot-dash lines in FIGURE 1.

Thus the sensing means, which includes the photoelectric cell 3 or similar light responsive device, the amplifier 4 and the relay R, "senses" whether the measuring instrument M indicates a satisfactory or reject measurement of the part being gaged. When the indication is "Satisfactory," the arms 13 and 14 of relay R will be in one position, and when the indication is "Reject" the arms will be in another position. These positions may be referred to as the "Satisfactory" position and the "Reject" position and, as noted above, are seen respectively in dot-dash lines and full lines in FIGURE 1.

Supply line 5 extends beyond switch 7 to an automatic timer unit 17 and the other side 6 of the current supply is also connected to the timer 17. A normally open foot switch 18 (it being understood that the term is also intended to comprehend a switch that is manually operated) is interposed in the connections from line 6 to timer 17 which is of the type, well-known and accordingly not described in detail herein, such that, as soon as, but not until, the switch 18 is closed, connections will be made from the current source 5—6 to lines 19 and 20 that lead from the timer and, after expiration of a predetermined period of time which may be adjusted by setting the dial 17', the circuit to lines 19—20 will automatically be broken. This cycle of operation of the timer 17 occurs whether closure of foot switch 18 is momentary or for a longer period. Thus, whenever switch 18 is closed the lines 19 and 20 will be connected to the current supply source for a predetermined period of time and then disconnected.

As will be referred to further later herein, the operator closes switch 18 after he has inserted a part W in the measuring instrument M and the measuring instrument has indicated the satisfactory or unsatisfactory condition of the part. As soon as the switch 18 is closed, lines 19—20 are activated and remain so for a predetermined period of time, for example 15 seconds. During this time, as will also be referred to later, the operator removes the part from the measuring instrument M and applies the marking device. If less time is required for this operation, the timer 17 may be set accordingly, it being desired to provide adequate time for the operator to effect the marking operation on one part but to then render the marking device inoperative so that the operator can not, either accidentally or on purpose, apply the mark to another part which he has not actually gaged.

Again referring to FIGURE 1, a connection is made from line 19 through lines 21 and 22 to the fixed ends of arms 13 and 14 of sensing relay R and line 20 is connected to ground. Arm 13 is disposed to engage contact points 23 and 24 and arm 14 is arranged to engage contact points 25 and 26 of relay R. Contact 24 is connected to a "Satisfactory" indicating lamp 27 which is connected on its other side to ground and contact 23 is connected to a "Reject" indicating lamp 28 which is also connected to ground. As line 20 is also connected to ground, it will be seen that when relay R is in "Reject" position as seen in full lines in FIGURE 1, the "Reject" indicating light 20 will, while timer 17 closes the connections to the current supply, be illuminated to indicate that the apparatus is set to give a reject mark. In like manner, if the coil 12 of relay R is energized as occurs when the "Satisfactory" indication is given by the instrument M, the arm 13 will complete the circuit from the timer output to the "Satisfactory" signal light 27.

A dual marking device of the electro-chemical type is indicated at E. This device, as will appear more fully in describing Figures 2 and 3, includes a "Satisfactory" marking element or stencil 29 and a "Reject" or unsatisfactory marking element or stencil 30. These stencils may take any desired form such as the part number or "OK" for a satisfactory mark and an "R" or other device for a reject mark. A power unit P of suitable and well-known type is provided for supplying proper energizing current to the electrolytic stencils 29 and 30 of the marking device E. Line 31 extends from power unit P to a work contact plate 32 on which a part W which is to be marked is placed during the marking operation. Extending to the "Satisfactory" marking stencil 29 of the device E from the power unit P is a line 33, and a line 34 extends from unit P to the "Reject" stencil 30.

The flow of activating current through the lines 33 or 34 to the stencils 29 or 30 is controlled by means which will be later described, but it is pointed out here that, when the power unit P is connected to the line 33 but not to line 34 and a part W is placed on the contact plate 32 and the marking head E moved so that the stencils 29 and 30 engage the part, the part will be marked with the "Satisfactory" mark only as the "Reject" marker or stencil 30 will not be activated and will be inoperative. In like manner, if line 34 is connected to the power unit P and line 33 is disconnected, the only mark that can be applied to a part will be the "Reject" mark.

Control means, including a "Satisfactory" control relay R' and a "Reject" control relay R", is provided for connecting the output of the power unit P to either the "Satisfactory" marker stencil 29 or the "Reject" marker stencil 30, depending upon whether the sensing means has responded to a "Satisfactory" or a "Reject" indicating of the measuring instrument or gage M.

Relays R' and R" are of the multiple arm type, relay R' having three movable arms 35, 36 and 37 mechanically connected by a link member 38, and relay R" has arm members 39, 40 and 41 mechanically connected by the link member 42. The arms of the relays R' and R" are normally held in the full line positions of FIGURE 1 as by springs 43 and 44 respectively, and the actuating coils or solenoids for moving the arms are indicated at 45 and 46 respectively.

The relays R' and R" coact with each other to provide a lock-in or holding means whereby, after either relay R' or R" is activated (according to the position of sensing relay R), the particular one of the relays R' or R" that has been activated will be locked or held in position to maintain connection from power unit P to the marking device E for the entire time period or cycle of the timer 17, regardless of whether, during this period, the signal given off by the measuring instrument M and transmitted to the relay R may change. Accordingly, the connections to and between the relays R' and R" and the other elements of my apparatus will first be described and their mode of operation will then be explained.

Line 19 from timer 17 is connected through line 47 to the fixed end of arm 35 of "Satisfactory" control relay R'. In like manner line 19 is connected to the fixed end of arm 39 of "Reject" control relay R" by line 48. The fixed end of arm 36 of relay R' is connected to the "Reject" contact point 25 of sensing relay R by line 49 and the fixed end of the corresponding arm 40 of relay R" is connected to the "Satisfactory" contact point 26 of sensing relay R by line 50. The fixed ends of arm 37 of relay R' and arm 41 of relay R" are respectively connected by lines 51 and 52 to the output line 53 from the power unit P. Input to the power unit P from the current supply controlled by timer 17 is through line 54 which extends to line 19, and line 55 to ground. A switch 56, seen in closed position in FIGURE 1, is interposed in line 54 so that the power unit P may be cut out of operation when it is desired to use a rubber stamp or other marking device instead of the electro-chemical device E as will be later explained. It will be observed that when switch 56 is closed to render the dual marking device E operative, power unit P will be activated, due to being connected to the current supply lines, during each cycle of the timer 17 but not at other times.

The contact point 57 for arm 41 of the "Reject" control relay R" is connected by line 34 to the "Reject" marker unit of the dual marking device E while contact point 58 for arm 37 of the "Satisfactory" control relay R' is connected to the "Satisfactory" marking unit or stencil 29 of device E by line 33. Energizing coil 45 of relay R' is connected on one side by line 59 to contact point 60 of arm 40 of relay R" and, in like manner, one side of energizing coil 46 of relay R" is connected by line 61 to contact point 62 of arm 36 of relay R'. The other side of coils 45 and 46 of relays R' and R" are respectively grounded through lines 63 and 64.

In order to complete a connection from power line 19 to coil 45 of relay R', line 65 extends from contact point 66 of arm 35 to line 59. Correspondingly, contact point 67 of arm 39 of relay R" is connected to one side of coil 46 through line 68 which in turn connects to line 61. In order to provide a record of the number of good and bad parts that have been gaged, an electrically operated counter C is connected across the lines 59 and 63 by which the coil 45 of relay R' is connected into the power supply. Accordingly each time coil 45 is energized, indicating the measurement and marking of one satisfactory part, the counter C will be actuated to record one good part. In like manner, and to record the number of "Reject" parts that are measured and marked, the "Reject" counter C' is connected across the leads 64 and 68 that connect coil 46 of relay R" to the current source each time a bad part is gaged and marked.

The operation of the circuitry hereinabove described to effect activation of either the "Satisfactory" marking stencil 29 or the "Reject" marking stencil 30 of the dual marker E in response to the indication of the measuring instrument M will now be described.

When the elements of my apparatus are in the positions shown in full lines in FIGURE 1, the equipment is ready to function, but neither of the marking units 29 or 30 is activated and thus if the device E were applied to a part, no mark would be made. The first step is for the operator properly to position a part W in the gage M so that the desired dimension or other quality of the part will be measured. Depending on the condition of the part, the instrument M will indicate either that it is "Satisfactory" or that it is "Reject." Let us assume first that the part is satisfactory and that accordingly the light 1 of gage M will be lighted, illuminating the bull's-eye 2. The light from bull's-eye 2 will act on photoelectric cell 3 and connections will be made by the amplifier 4 to connect the coil 12 of the relay R directly to the power line 5—6, switch 7 having first been closed to activate the entire apparatus.

After the part W has been gaged as evidenced by indicating means, such as bull's-eye 2, on the measuring instrument M, the foot switch 18 is closed by the operator. This closing is preferably only momentary but, as pointed out above, the timer 17 is of the type such that after the connection is made to the timer from the supply line 5—6 through the switch 18, the timer will maintain a direct connection from supply line 5—6 to lines 19—20 regardless of whether the foot switch is kept closed or permitted to return to normal open position during the timer period. While the timer 17 is running, the output lines 19—20 are energized and will stay in this condition until the predetermined time runs out. During this time the the operator removes the part W from the measuring instrument M and places it on the work contact plate 32. As will be explained later, the proper stencil of the dual marking device E will be energized immediately upon closing the foot switch 18 and will remain energized until the predetermined time expires. While the timer 17 maintains the connection to lines 19—20 the operator applies the marking device E to the part W and, in the circumstances being described, the "Satisfactory" or "OK" mark will be applied.

As soon as coil 12 of sensing relay R is energized due to light from bull's-eye 2 acting on photoelectric cell 3, the arms 13 and 14 of relay R will be moved up into their dot-dash line positions of FIGURE 1. Arm 13 of the relay R will then complete connection from power line 19 (which is now live because foot switch 18 has been closed to operate timer 17) to one side of indicating lamp 27. The other side of lamp 27, which may be green, is grounded, completing the circuit to the timer output, and the lamp will be illuminated indicating that a satisfactory part has been measured.

Concurrently with the movement of arm 13, arm 14 of relay R will move up into contact with contact point 26 (the dot-dash position of FIGURE 1), and this will complete a connection from line 19 through lines 21, 22 and 50 to the stationary end of arm 40 of relay R". The coil 46 of relay R" has not been activated and accordingly arm 40 thereof will be held in its full line position (FIGURE 1) by spring 44 and connection will be established through arm 40, contact point 60 and line 59, back to the coil 45 of relay R'. Thus, as soon as relay R is energized in response to a "Satisfactory" signal from the measuring instrument M, a circuit is completed between the power output of timer 17 and the coil 45 of the "Satisfactory" relay R'. This circuit is from line 19 through lines 21 and 22, arm 14, contact point 26 and line 50, arm 40 of relay R", contact point 60 and line 59 to coil 45. The circuit is completed by the ground connection 63 from coil 45, the other side of the output of timer 17 being grounded through line 20.

As has just been described, when sensing relay R is moved to indicate a satisfactory part, the coil 45 of the control relay R' will be energized, causing the arms 35, 36 and 37 thereof simultaneously to move up in their dot-dash positions in FIGURE 1. As soon as this occurs, arm 37, which is connected to the power unit P through lines 51 and 53, will complete connection to the "Satisfactory" stencil 29 of device E through contact point 58 and line 33. Thus, the "Satisfactory" stencil will be energized and the unit E will be in condition to apply a "Satisfactory" mark to the part. The "Reject" stencil 30 is still de-energized and will not make any mark.

It is important to prevent coil 45 of relay R' from being de-energized, after the initial energization just referred to, until completion of the time period that starts to run when foot switch 18 is closed, even though during this time period the part is removed from gage M causing the bull's-eye 2 to go dark and thus de-energizing coil 12 of relay R and also causing the connection to coil 45 through arm 14 of relay R to be broken. When this occurs, if it were not for a lock-in or holding arrangement provided by arm 35 of relay R', the "Satisfactory" stencil 29 would be de-energized with possible erroneous marking of the part.

When coil 45 of relay R' is energized due to the completion of connection to the supply line 19 by arm 14 of relay R, the arms 35, 36 and 37 of relay R' are moved up into their dot-dash positions (FIGURE 1). Arm 35 then makes a direct connection to coil 45 of relay R' from the supply lines 19—20 through lines 47, 65, 59 and ground connection 63. After this lock-in connection is established, coil 45 will remain energized until the circuit 19—20 is broken by timer 17 regardless of any changes in the position of the sensing relay R.

The operation of the apparatus when a "Reject" or unsatisfactory part is placed in the gage M will now be explained.

Under these circumstances the bull's-eye 2 will not light up and, as the photoelectric cell 3 is arranged to receive light only from bull's-eye 2, it would not be affected by a signal from a "Reject" bull's-eye if such is provided on the instrument M. As the photoelectric cell 3 is not activated, the amplifier 4 will continue to hold open the circuit to coil 12 of relay R from power line 5—6 through lines 8, 9, 10 and 11, and sensing relay R will remain in the full line ("Reject") position of FIGURE 1 with the arms 13 and 14 engaging contact points 23 and 25 respectively. Now when the operator closes the foot switch 18, starting the timer 17 and connecting supply lines 19—20 to the current source, the "Reject" signal lamp 28 will light up because it is directly connected to the current supply through lines 19, 21, 22, arm 13, contact point 23 and ground. At the same time arm 14 connects supply line 19 to contact point 36 of relay R' through line 49. Relay R' is not activated, however, because the power circuit to coil 45 is broken as seen by the full line position of arm 35 of relay R'. Immediately upon closing the foot switch 18, connection will be made, however, to energize coil 46 of relay R" through lines 19, 21, 22, arm 14 of relay R, line 49, arm 36 of relay R', contact point 62, line 61, and back through ground connection 64 to timer ground line 20. Thus, with the sensing relay R in reject position, as soon as foot switch 18 is closed, coil 46 of relay R" will be energized moving the arms 39, 40 and 41 thereof up into their dash line positions of FIGURE 1. When arm 39 is so moved, it completes a direct connection from the power lines 19—20 through line 48, arm 39, contact point 67 and line 68 to the coil 46 of relay R". Thus this coil 46 becomes "locked-in" and will remain energized until the timer 17 breaks the circuit to lines 19—20 at the end of the predetermined time. The lock-in action is the same as that described for coil 45 of relays R' and is effective regardless of any changes that may occur during the predetermined time period in the position of the sensing relay R.

When coil 46 of relay R" is energized in response to a "Reject" reading of the gage M, arm 41 will be moved into engagement with contact point 57 completing the connection from power unit P to the "Reject" marking unit 30 of the device E through lines 53, 52, arm 41, contact point 57 and line 34. The "Reject" marker unit 30 will now be rendered operative while the "Satisfactory" marker 29 will be inoperative because connection between it and power unit P is broken by virtue of arm 37 of relay R', which has not been activated, being in its solid line position in FIGURE 1.

Under the circumstances described immediately above, where the measuring instrument gives an unsatisfactory indication, only the "Reject" marking unit will be activated and rendered operative to apply a mark to the part. The "Reject" marking stencil 30 will remain operative for the entire time period during which timer 17 completes the connections between the lines 5—6 and lines 19—20.

From the above description of the operation of the illustrated form of my invention as associated with an electrolytic type marking device, it will be seen that, by properly setting the timer 17, just enough active time of the dual marking device may be provided to permit the operator to remove a gaged part from the instrument M, place it on the contact plate 32, and apply the marking stencil. If this takes, for example, about twelve seconds, the timer 17 might be set to run for fifteen seconds. With such an arrangement the operator will not have time, assuming that an "OK" part has been measured to remove the piece that has actually been gaged after marking same and placing another ungaged piece on the work contact plate 32 and applying an "OK" signal thereto. In like manner, he could not, during one cycle of timer 17, duplicate a "Reject" signal on a part that had not been properly gaged. As different gaging operations and different types of parts would require a different amount of time, the adjustable feature of timer 17 facilitates rapid production while still maintaining the safety feature which prevents marking ungaged parts.

Although the above explanation has been directed to the use of an electro-chemical or electrolytic type dual marking device E, printing or rubber stamp type marking devices may also readily be employed. Such a device is illustrated in detail in FIGURES 4 and 5 and is seen at S in FIGURE 1. As will appear more fully in the description of FIGURES 4 and 5, this device has a "Satisfactory" stamp 72 and a "Reject" stamp 73. Device S is so arranged that the "Reject" stamp 73 is normally in position to be applied to the part to be gaged while the "Satisfactory" stamp 72 is retracted into housing so that it cannot be applied to the work. This position is indicated in FIGURE 1, and a Bowden wire or flexible cable operating connection 74 is provided extending from device S so that its remote end is positioned to be operatively engaged by the plunger 75 of a power unit P' which, as illustrated, is in the form of a solenoid. Coil 77 of unit P' is connected directly across the connections that lead to the coil 45 of the "Satisfactory" control relay R' by lines 78 and 79. A switch 79' is interposed in line 79 and, when it is desired to use the stamp type marking device S, this switch is closed and the switch 56 is opened. It will be understood that when the electrolytic marking device E is to be used, switch 79' will be opened and switch 56 will be closed as is seen in FIGURE 1.

The power unit P' is so arranged that the plunger 75 is normally held in "Reject" (retracted) position as by a suitable spring or the like (not shown). Plunger 75 will remain in this position as long as the coil 77 is not energized. As previously explained, coil 45 of relay R' is energized only when a "Satisfactory" part has been gaged and the foot switch 18 has been closed while the instrument M indicates the "Satisfactory" condition. At other times the coil 45 will not be energized and consequently the coil 77 of solenoid type power unit P' will not be energized and the marking device S will remain with the "Reject" stamp 73 in operating position.

Thus, whenever the instrument M indicates a "Reject" part, the operator, when he applies the stamp device S, will put a "Reject" mark 73 on the part. If the instrument M indicates a "Satisfactory" part, however, the coil 45 of relay R' will be energized for the time period established by timer 17. During this time period, the coil 77 will be energized causing the plunger 75 to be moved downwardly pushing the end 74' of the Bowden wire 74 and rotating the stamp holder disk 80 to move the "Satisfactory" stamp 72 into operative position and to retract the "Reject" stamp 73 into the housing 90 (see FIGURE 4). When the operator now applies device S to the part, it will be marked with the "Satisfactory" stamp and, upon expiration of the timer control period, the stamp device S will return to "Reject" position under the influence of spring 81 (see FIGURE 4) and/or other suitable means.

By using fountain type rubber stamp units for markers 72 and 73, a large number of parts may be marked before it is necessary to replenish the ink supply. Of course, under some circumstances the marking device might be a metal impact stamp, and it will be understood that my apparatus may readily be adapted to various different types of marking devices.

Referring now to FIGURE 2, the electro-mechanical marking device E illustrated therein includes two independent stencils 29 and 30, stencil 29 having a symbol thereon indicating a "Satisfactory" condition of the part and stencil 30 being designed to apply a symbol indicating a "Reject" condition. These stencils and their supporting holders may be of any suitable and well-known form adapted to be dipped into and retain a liquid electrolyte in well-known manner. The electrolyte is such that when current flows therethrough to the part to be marked, an electrolytic action takes place which etches the part sufficiently to make a mark thereon which corresponds in design to the stencil being used. The "Satisfactory" stencil unit 29 is enclosed in an end cap member 82 and extends through an aperture 83 therein. A separate aperture 84 permits "Reject" stencil 30 to extend therethrough. The shell or housing 85 of unit E encloses a carbon contact member 86 which is held in electrical contact with the rear end of stencil unit 29 by an electrical conductor in the form of a compression spring 87, the opposite end of which is connected to a prong 33' which in turn is adapted to be connected to the line 33 of FIGURE 1. In like manner prong 34' is adapted to connect line 34 to "Reject" stencil 30 through the compression spring conductor 88 and carbon contactor 89 which are supported in housing 85 in spaced relation to the connections to stencil 29. The carbon contactor units 86 and 89 are provided to prevent corrosion of the electrical connections to the stencils 29 and 30 that might occur due to the electrolyte commonly used.

FIGURES 4 and 5 illustrate the rubber stamp type marking device S which includes an elongated, generally tubular housing 90. The Bowden wire or flexible cable operating connection 74 extends through one end of housing 90 and has its movable part secured to a sliding block 91 supported in a chamber or recess 92 in housing 90. Block 91 is slidable on and guided by a rod member 93 secured in the housing 90 and a compression spring 94 surrounds rod 93 and engages block 91 at one end and a fixed boss 95 at its opposite end. Spring 94 normally holds sliding block 91 in its lefthand position as seen in FIGURE 4.

A link 96 extends from block 91 to the stamp holding disk 80 which is rotatably supported in housing 90 as on a pin 97. As seen in FIGURE 4, the connection of link 96 to disk 80 is offset from the center 97 of the disk. Accordingly when block 91 is moved to the right by the Bowden wire or cable unit 74, the link 96 will also move to the right and the disk 80 will be rotated counterclockwise through 90°, thus causing the "Reject" stamp 73, which is attached to and movable with disk 80, to be retracted into the housing S and the "Satisfactory" stamp 72 to be moved into operating position projecting out through the slot 98 (see FIGURE 5) in the end of housing S. It will be appreciated that the marking device S is illustrated rather diagrammatically in FIGURES 4 and 5 and that it might take numerous other forms so long as a plurality of stamp units are provided which are selectively movable into and out of operating position in response to readings of a gage or measuring instrument.

It will also be understood that although I have illustrated my invention as an apparatus for marking parts as either "Satisfactory" or "Reject," a greater number of qualities or conditions of the part might be measured and marked. Measuring instruments are available which will measure a dimension of a part and indicate a range within which the measurement falls. In other words, the instrument might give one signal if a part measures above the desired range, a second signal if within the desired range, and a third signal if below the desired range. My apparatus may be applied to such an instrument by providing another sensing relay unit which would be responsive to the third measurement of the instrument. This extra sensing relay would be connected to another set of control means, similar to the relays R' and R", to control the connection, for example, of a third electrochemical stencil unit to a power unit P. Furthermore, the sensing relay of my apparatus may be arranged to be responsive to a plurality of measuring stations on the measuring instrument so that the "Satisfactory" marker will be activated only when all of the quantities measured are within the prescribed tolerances.

Thus although I have described the illustrated form of my invention in considerable detail, it will be understood that variations and modifications may be made in the form and arrangement of the parts, and in the particular electrical or mechanical connections utilized, without departing from the spirit of my invention. I do not, therefore, wish to be limited to the exact arrangements herein illustrated and described, but claim as my invention all the embodiments coming within the scope of the appended claims.

I claim:

1. In inspection marking apparatus, a measuring instrument having indicating means for indicating a plurality of predetermined values of a measurement of a part being measured by said instrument, a sensing means responsive to said indicating means, a multiple marking device having in a single body portion a plurality of different marking units, a current supply line adapted to be connected to a source of electric current, a power unit for activating said marking units, control means responsive to said sensing means and adapted to control said power unit whereby only the one of said marking units will be activated which corresponds to the value indicated by said measuring instrument, switch means in said current supply line for connecting said source of electric current to said power unit, adjustable timer means for disconnecting said source of electric current from said power unit only after the elapse of a predetermined time after said source of current has been connected to said power unit by said switch means, and holding means whereby a marking unit activated by said control means in response to said sensing means will remain activated until said timer means disconnects said source of electric current from said power unit, regardless of changes in the indication of said measuring instrument which may occur during the predetermined time for which said timer means has been set.

2. In inspection marking apparatus, a measuring instrument having indicating means for indicating a satisfactory or a reject value of a measurement of a part being measured by said instrument, a sensing means responsive to said indicating means, a dual marking device having in a single body portion a "Satisfactory" marking unit and a "Reject" marking unit, a current supply line adapted to be connected to a source of electric current, a power unit for activating one or the other of said marking units, control means responsive to said sensing means and adapted to control said power unit whereby when a part has measured satisfactory only said "Satisfactory" marking unit will be activated and, when a part has measured reject, only said "Reject" marking unit will be activated, switch means for connecting said source of electric current to said power unit, adjustable timer means for disconnecting said source of electric current from said power unit only after the elapse of a predetermined time after said source of current has been connected to said power unit by said switch means, and holding means whereby a marking unit activated by said control means in response to said sensing means will remain activated until said timer means disconnects said source of electric current from said power unit, regardless of changes in the indication of said measuring instrument which may occur during the predetermined time for which said timer means has been set.

3. In inspection marking apparatus, a measuring instrument having indicating means for indicating a satisfactory or a reject value of a measurement of a part being measured by said instrument, a sensing means responsive to said indicating means, a dual marking device having in a single body portion a "Satisfactory" marking unit and a "Reject" marking unit, a current supply line adapted to be connected to a source of electric current, a power unit connected to said supply line, electrical connections from said power unit to said marking device, control means in said electrical connections, said control means being responsive to said sensing means and adapted to control said electrical connections from said power unit to said marking device whereby, when a part has measured satisfactory, only said "Satisfactory" marking unit will be connected to said power unit and, when a part has measured reject, only said "Reject" marking unit will be connected to said power unit, switch means for connecting said source of electric current to said power unit, adjustable timer means for disconnecting said source of electric current from said power unit only after the elapse of a predetermined time after said source of current has been connected to said power unit by said switch means, and holding means whereby the electrical connection from said power unit to said marking device established by said control means in response to said sensing means will be maintained as established until said timer means disconnects said supply line from said power unit, regardless of changes in the indication of said measuring instrument indicating means which may occur during the predetermined time for which said timer is set.

4. In inspection marking apparatus, a measuring instrument having indicating means for indicating a satisfactory or a reject value of a measurement of a part being measured by said instrument, a sensing means responsive to said indicating means, a dual electro-chemical marking device having a single head portion a "Satisfactory" marking unit and a "Reject" marking unit, said marking device being adapted to be manually applied to the part being measured, an electric current supply line, a power unit connected to said supply line and adapted to furnish operating current for said marking device, electrical connections between said power unit and said marking device, control means responsive to said sensing means for controlling said electrical connections whereby when a part has measured satisfactory only said "Satisfactory" marking unit of said marking device will be connected to said power unit and when a part has measured reject only said "Reject" marking unit of said marking device will be connected to said power unit, manually operable switch means in said supply line for closing an electrical circuit from said supply line to said power unit, adjustable automatic timer means for opening said circuit independently of said manual switch means and only after the elapse of a predetermined time after closing of said circuit by said manual switch means whereby, when a part has been measured by said instrument and said manual switch means has been closed while said indicating means indicates the condition of the part, if said marking device is applied to the part during the time period for which said circuit remains closed, the part will be marked "Satisfactory" or "Reject" according to the indication of said indicating means of said measuring instrument, and holding means whereby the electrical connection from said power unit to said marking device established by said control means in response to said sensing means will be maintained as established until said timer means disconnects said supply line from said power unit, regardless of changes in the indication of said measuring instrument indicating means which may occur during the predetermined time for which said timer is set.

5. In inspection marking apparatus, a measuring instrument having indicating means for indicating a satisfactory or a reject value of a measurement of a part being measured by said instrument, a sensing means responsive to said indicating means, a dual electrolytic marking device having in a single head portion a "Satisfactory" marking unit and a "Reject" marking unit, said marking device being adapted to be manually applied to the part being measured, an electric current supply line, a power unit connected to said supply line and adapted to furnish operating current for said electrolytic marking device, electrical connections between said power unit and said marking units of said electrolytic marking device, control means responsive to said sensing means for controlling said electrical connections whereby when a part has measured satisfactory only said "Satisfactory" marking unit of said marking device will be connected to said power unit and when a part has measured reject only said "Reject" marking unit of said marking device will be connected to said power unit, means for electrically connecting a part that has been measured to said power unit, operator controlled switch means for effecting closing of the electrical circuit from said supply line to said power unit, timer means for opening said circuit independently of said switch means and only after the elapse of a predetermined time after closing of said circuit by said switch means whereby, when a part has been measured by said instrument and said switch means has been closed while said indicating means indicates the condition of the part, said part may be connected to said power unit and said electrolytic marking device may be applied to the part during the time period for which said circuit remains closed and the part will be marked "Satisfactory" or "Reject" by the corresponding marking unit according to the indication of said indicating means of said measuring instrument, and holding means whereby the electrical connection from said power unit to said marking device established by said control means in response to said sensing means will be maintained as established until said timer means disconnects said supply line from said power unit, regardless of changes in the indication of said measuring instrument indicating means which may occur during the predetermined time for which said timer is set.

6. In inspection marking apparatus, a measuring instrument having indicating means for indicating a satisfactory or a reject value of a measurement of a part being measured by said instrument, a sensing means responsive to said indicating means, a dual printing type marking device having in a single head portion a "Satisfactory" marking unit and a "Reject" marking unit, one of said marking units being normally in retracted or non-printing position, means for moving said one of said marking units into advanced or printing position and the other of said units into retracted position, an electric current supply line, a power unit adapted to be connected to said supply line and to move said marking units of said marking device, control means responsive to said sensing means for controlling the connection of said power unit to said supply line whereby when a part has measured satisfactory only said "Satisfactory" marking unit of said marking device will be in printing position and when a part has measured reject only said "Reject" marking unit of said marking device will be in printing position, operator controlled switch means for effecting closing of the electrical circuit from said supply line to said power unit, timer means for opening said circuit independently of said switch means and only after the elapse of a predetermined time after closing of said circuit thereof by said switch means whereby, when a part has been measured by said instrument and said switch means has been closed while said indicating means indicates the condition of the part, said printing type marking device may be applied to the part during the time period for which said circuit remains closed and the part will be imprinted "Satisfactory" or "Reject" by the corresponding marking unit according to the indication of said indicating means of said measuring instrument, and holding means whereby the electrical connection from said power unit to said marking device established by said control means in response to said sensing means will be maintained as established until said timer means disconnects said supply line from said power unit, regardless of changes in the indication of said measuring instrument indicating means which may occur during the predetermined time for which the timer is set.

7. In marking apparatus for use with a measuring instrument having indicating means responsive to a measurement of a part being gaged, a multiple marking device having a plurality of independent marking units, said marking units being carried by a manually movable body portion of said marking device, means, responsive to said indicating means of said measuring instrument, for selectively rendering one only of said marking units operable at one time, and adjustable timer means for activating said means for rendering a marking unit operable and then deactivating said means after a predetermined time lapse.

8. In marking apparatus for use with a measuring instrument having indicating means responsive to a measurement of a part being gaged, a multiple marking device having a plurality of independent marking units, said marking units being carried by a body portion of said marking device, means, responsive to said indicating means of said measuring instrument, for selectively rendering one only of said marking units operable at one time, adjustable timer means for activating said means for rendering a marking unit operable and then deactivating said means after a predetermined time lapse, switch means for initiating the operation of said timer means, and holding means whereby a marking unit after being rendered operable will remain operable until said timer means deactivates the means for rendering the marking unit operable, regardless of changes in the indication of said measuring instrument which may occur during said predetermined time lapse.

References Cited in the file of this patent

UNITED STATES PATENTS

| | | |
|---|---|---|
| 1,011,123 | Degelow | Dec. 5, 1911 |
| 2,647,456 | Aller et al. | Aug. 4, 1953 |
| 2,770,047 | Mawbey | Nov. 13, 1956 |